(12) United States Patent
Niimi et al.

(10) Patent No.: US 7,017,993 B2
(45) Date of Patent: Mar. 28, 2006

(54) SEAT DEVICE

(75) Inventors: Naoki Niimi, Kariya (JP); Hiroyuki Okazaki, Chiryu (JP); Shin Shiraki, Kakamigahara (JP)

(73) Assignees: Aisin Seiki Kabushiki Kaisha, Kariya (JP); Gifu Shatai Kogyo Kabushiki Kaisha, Kakamigahara (JP)

( * ) Notice: Subject to any disclaimer, the term of this patent is extended or adjusted under 35 U.S.C. 154(b) by 0 days.

(21) Appl. No.: 10/326,411

(22) Filed: Dec. 23, 2002

(65) Prior Publication Data

US 2003/0122412 A1    Jul. 3, 2003

(30) Foreign Application Priority Data

Dec. 25, 2001    (JP)    ............... 2001-391878

(51) Int. Cl.
  *A47C 1/02*    (2006.01)
(52) U.S. Cl. ...................................... 297/341
(58) Field of Classification Search ................. 297/341
  See application file for complete search history.

(56) References Cited

U.S. PATENT DOCUMENTS

| 5,352,019 | A | | 10/1994 | Bauer et al. | |
| 5,605,377 | A | * | 2/1997 | Tame | ................. 297/341 |
| 5,855,413 | A | * | 1/1999 | Couasnon et al. | ........... 297/341 |
| 5,882,074 | A | * | 3/1999 | Kojima | ................. 297/341 |
| 6,048,030 | A | * | 4/2000 | Kanda et al. | ................. 297/341 |
| 6,098,946 | A | * | 8/2000 | Sechet et al. | ................. 248/424 |
| 6,336,679 | B1 | * | 1/2002 | Smuk | ................. 297/378.12 |
| 6,341,819 | B1 | | 1/2002 | Kojima et al. | |
| 6,478,358 | B1 | | 11/2002 | Okazaki et al. | |
| 6,616,233 | B1 | * | 9/2003 | Debus et al. | ................. 297/341 |
| 6,641,218 | B1 | * | 11/2003 | Ito et al. | ................. 297/378.12 |

FOREIGN PATENT DOCUMENTS

| DE | 100 20 923 A1 | 12/2001 |
| DE | 101 36 244 C1 | 8/2002 |
| FR | 2 787 749 A1 | 6/2000 |
| FR | 2 797 234 A1 | 2/2001 |
| JP | 2001-63410 A | 3/2001 |

* cited by examiner

*Primary Examiner*—Peter M. Cuomo
*Assistant Examiner*—Sarah B. McPartlin
(74) *Attorney, Agent, or Firm*—Buchanan Ingersoll PC

(57) ABSTRACT

A seat device is provided, in which a locking condition of an upper rail (2) to a lower rail (1) is released and a seat can be moved in forward direction when a seatback is turned down in forward direction due to a walk in operation. A turning bracket (18) is pivotally supported on the side portion of a lower arm (3) fixed to the upper rail (2). An actuating lever (20) for actuating a lock mechanism is fixed to a turning pin (17) for supporting a turning bracket (18). A cable (15) is connected to the turning bracket (18), a hook member (22) is pivotally supported on the side portion of the lower arm (3), and a detecting member (29) is supported thereby in a turning way. A projecting portion (25) of a hook member (22) can be engaged with or disengaged from a notch portion (31) of a turning bracket (18).

19 Claims, 9 Drawing Sheets

A ←→ B

SEAT DEVICE

CROSS REFERENCE TO RELATED APPLICATION

This application is based on and claims priority under 35 U.S.C. § 119 with respect to Japanese Application No. 2001-391878 filed on Dec. 25, 2001, and the entire content of which is incorporated herein by reference.

FIELD OF THE INVENTION

This invention generally relates to a vehicle seat device equipping a walk in mechanism.

BACKGROUND OF THE INVENTION

Conventionally, a vehicle is equipped with a walk in mechanism for moving a front seat in forward direction in order to make the passenger easily entry on or off the rear seat of the vehicle by releasing a locking mechanism of a seat slide device, when the seatback (a back seat of the front seat) turns in forward direction.

An example of a seat device equipping a walk in mechanism is disclosed in a Japanese Patent Laid-Open Publication No. 2001-63410. This disclosed seat device has an upper rail being capable of sliding freely on a lower rail fixed to a vehicle floor in forward and backward directions. This seat device has a lock/unlock mechanism and usually maintains the seat device in a locking condition by fixing the upper and lower rails each other. The lock/unlock mechanism includes a side tooth (or a nail) of an operational handle supported in the upper rail side portion. The side tooth can engage with or disengage from a window provided in the lower rail. When the walk in mechanism is operated, the operational handle is moved and the side tooth is disengaged from the window, then the upper rail is made slidable on the lower rail in forward and backward directions.

In the foregoing disclosed publication, a supporting bracket is fixed to a top surface of an upper rail. A moving member is displaced to be capable of sliding in forward and backward directions relative to the supporting bracket. The moving member is maintained in the original position by a spring force. The moving member is connected to the seatback of the front seat by a cable.

When the seatback of the front seat is turned down in forward direction for easy entry of the passenger to the rear seat or getting out from the rear seat, the cable is pulled and the moving member is moved by the cable in the backward direction against the spring force on the top surface of the upper rail. In this way, due to the movement the moving member in the backward direction, the operational handle is moved and the side tooth thereof is disengaged from the window of the lower rail. Then the locking condition of the both rails is released. Therefore, the seat can be moved in forward or backward direction.

After the entry or getting out of the passenger to or from the rear seat is completed, in order to restore the seat to the original seating position, the walk in mechanism of the prior technology is provided with a memory mechanism including a finger member and a hook member installed on the moving member. In such a configurations, on the restoring process of the seating position to the original, the hook member engages with a hole formed on a plate fixed on the upper rail and maintains the moving member to disengage the side tooth from the window. And once the seat reaches at the original position, the engagement of the hook member with the upper rail is released by the operation of the finger member. The moving member is permitted to slide in forward direction and leaves from the operational handle to disengage the side tooth from the window of the lower rail. Then the lock condition between the upper rail and lower rail is also restored in the original position.

In the foregoing seat device, the hook device is pivotally supported on the moving member and to the upper rail, and engages with or disengages from the hole formed on the plate. For the smooth slide of the moving member on the upper rail, rather loose engagement between the moving member and the upper rail is required. This loose engagement, however, makes the hook position be unstable relative to the hole. This unstable engagement of the hook member to the hole of the metal plate may cause unstable position restoring operation.

In addition thereto, the movement of the moving member of the walk in mechanism on the one side of the seat device is transmitted to a latch member of the walk in mechanism on another side of the seat device by a connecting rod and long holes formed in levers attached on the both ends of the rod. The long holes engage with pins fixed on the moving members on the both side seat device. In this configuration, due to the rigidity of the rod and the gaps between the pins and the long holes, the movement transmission between the both of walk in mechanisms may be unstable and this may also cause unstable position restoring operation.

Therefore, the object of the present invention is to solve a disadvantageous point of the conventional technology described in the foregoing.

SUMMARY OF THE INVENTION

In order to solve the foregoing problem, the present invention provides a seat device having a lock/unlock mechanism for releasing a locking condition between a lower rail and an upper rail by turning down a seatback in forward direction and allowing said upper rail to slide on said lower rail, comprising: a turning bracket of said lock/unlock mechanism rotatably supported on a lower arm fixed to said upper rail; an actuating lever turning together with said turning bracket; and a lock segment inserted into opening portions of both rails in accordance with movement of said actuating lever, wherein said seatback turning down in said forward direction causes to turn said turning bracket and said actuating, lever in one direction and release a locking condition of said both rails.

In accordance with the present seat device, by utilizing the actuating lever and the turning bracket which are rotatably supported by the lower arm fixed to the upper rail, the turning bracket is turned in conjunction with the seatback turning down in forward direction and locking engagement between the upper rail and the lower rails released. In this configuration, movements of each members are transmitted only by a rotational movement. That is, to say, since there is no sliding engagement of the members on the upper rail which requires loose engagement, or gaps between the members. Therefore, unstable cooperation of the both of walk in mechanisms can be avoided, and this achieves exact position restoring operation.

Further, since the hook member for maintaining an unlocking condition between the upper rail and the lower rail are arranged not to slide but merely turn, this configuration does not require large space for installing members, and contributes to the compact design of the seat device.

BRIEF DESCRIPTION OF THE DRAWING

The foregoing and additional features and characteristics of the present invention will become more apparent from the following detailed description considered with reference to the accompanying drawing figures wherein.

DETAIL DESCRIPTION OF THE INVENTION

The embodiment of the present invention is explained hereinafter with reference to drawings.

Figure 1:
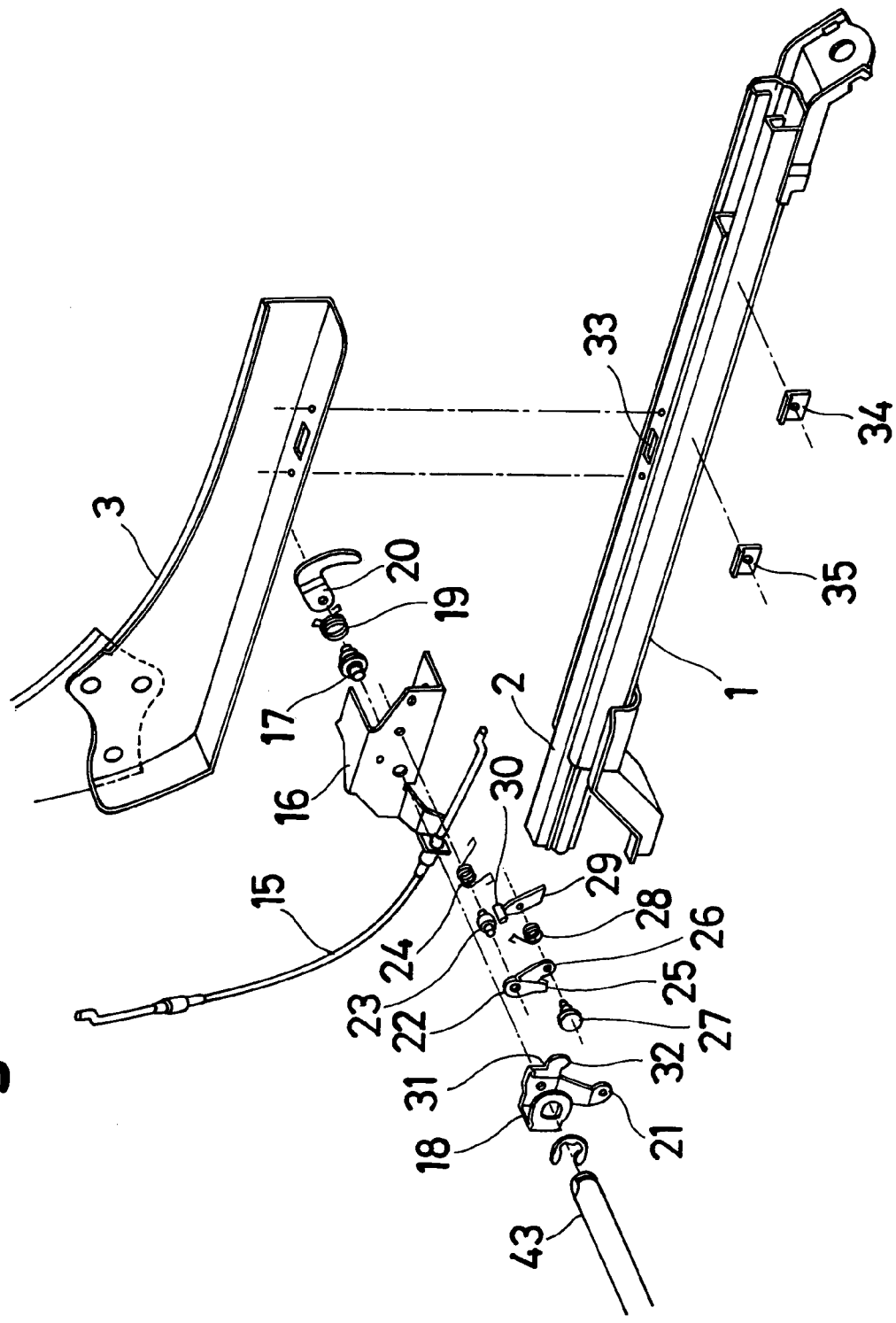
FIG. 1 is an exploded view of a locking mechanism of both rails as an example of the present invention.

First, one example of the present invention is explained with reference to FIGS. 1 and 2.

An upper rail 2 is installed in a sliding way in forward and backward directions of a lower rail 1 adapted to be fixed on a vehicle floor. A lower arm 3 is fixed to the upper rail 2. An upper arm attached on the side of a seatback is assembled with the lower arm 3 attached on the side of a seat cushion in a reclining way in forward and backward directions by a pin 5. A turning member 6, which turns together with the upper arm 4, is fixed to the upper arm 4. The turning member 6 is made of a plate having a nearly rectangular shape, and a free end portion 7 projects from a circumferential surface 8 of the upper arm 4.

The first link member 10 has a shape of "L," and rotatably connected to the lower arm 3 by a pin 9. A contact pin 11 is fixed to one end of the first link member 10 and a pin 12 is fixed to another end of the first link member 10.

The second link member 13 having a nearly sector shape is rotatably connected to the lower arm 3 by the pin 9. The second link member 13 is provided with a long hole 14 for receiving the pin 12 of the first link member 10 and supports one end of a cable 15.

Figure 2:
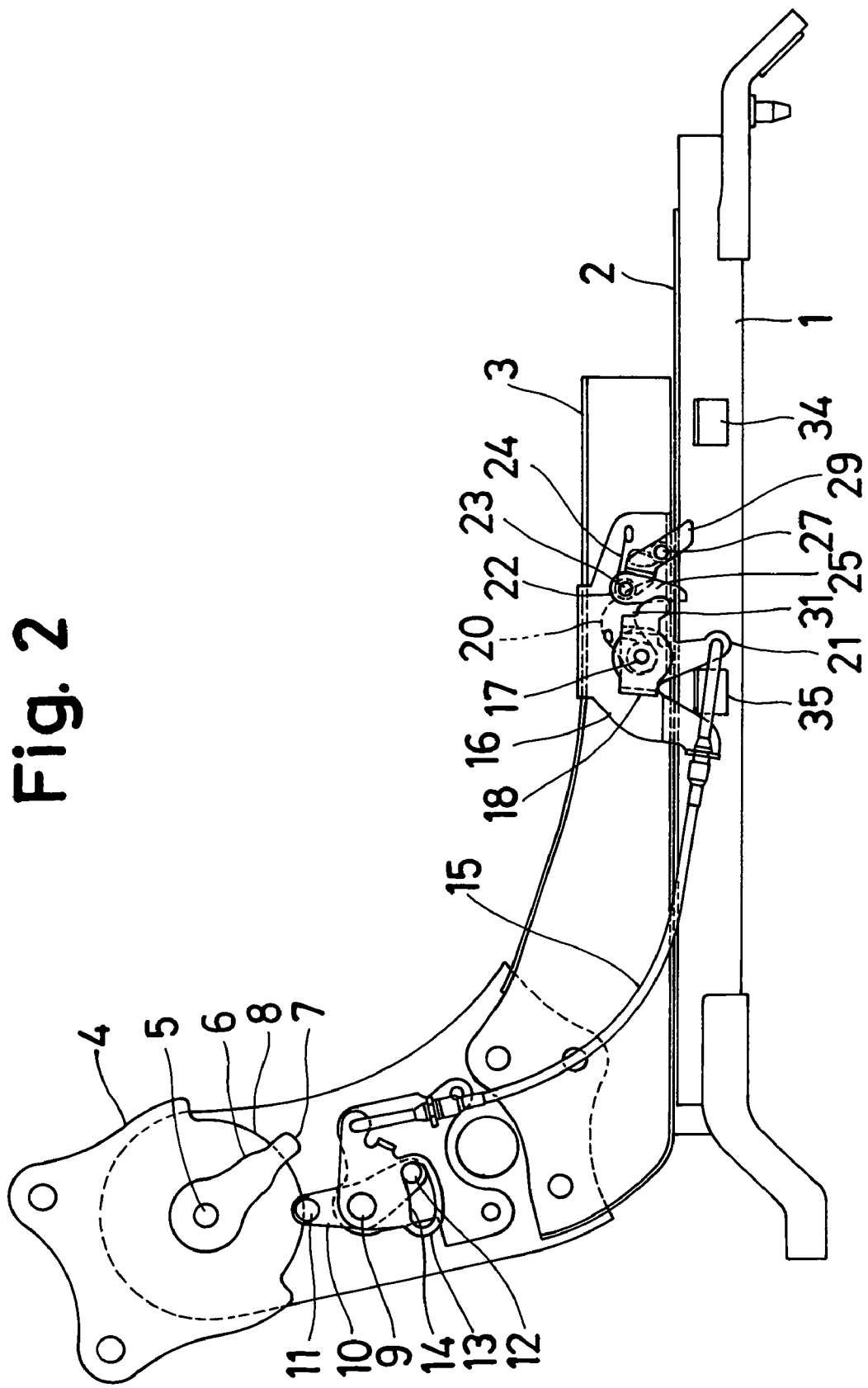
FIG. 2 is a side view of a regular case of a seat.

When the seat is set in a seating position as illustrated in FIG. 2, the contact pin 11 is positioned in the left side (FIG. 2) of the free end portion 7 of the turning member 6, and the pin 12 is positioned in the right end corner (FIG. 2) of the long hole 14. Both of the link members 10 and 13 are biased in counterclockwise directions of FIG. 2 by a spring (not illustrated).

One end of the cable 15 is supported by a frame 16, which has a "C" shaped cross section and is fixed on the front end portion of the lower arm 3. A turning bracket 18 as a member of a lock/unlock mechanism is fixed to an end of a turning pin 17 penetrating the frame 16. An actuating lever 20 which has a shape of "L" receives an biasing force of a spring 19, and is fixed to another end of the turning pin 17.

The cable 15 is connected to a leg segment 21 of the turning bracket 18. In this way, if the cable 15 is pulled, the actuating lever 20 is turned together with the turning bracket 18 in clockwise direction (in FIG. 1).

Figure 9:
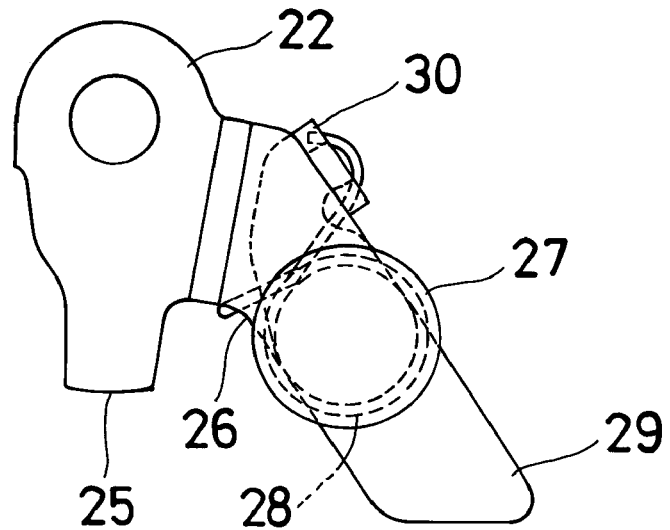
FIG. 9 is a front view of a case that a hook member and the detector member are assembled together.
Figure 10:
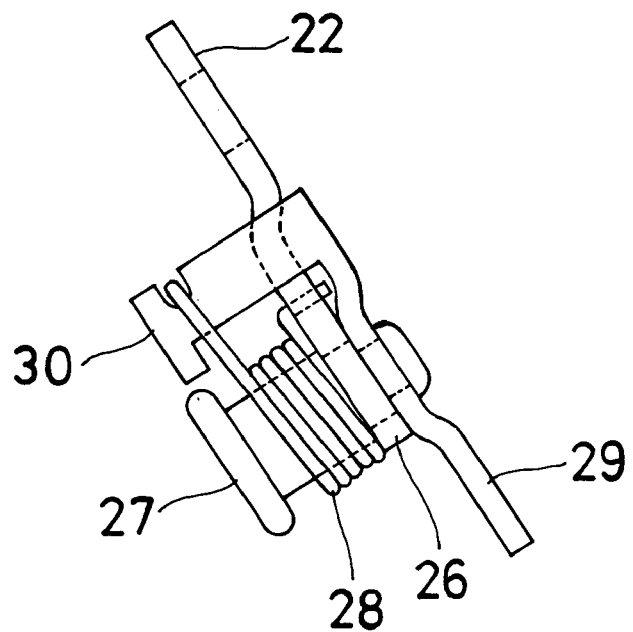
FIG. 10 is a top plane view of FIG. 9.

A hook member 22 made of a plate, which has an approximate "V" shape, is rotatably supported by a pin 23 and a spring 24 on the side surface of the frame 16. The hook member 22 has a projecting portion 25 and a mounting portion 26 and a detecting member 29 is connected to the mounting portion 26 in a turning way by a pin 27 and a spring 28. A latch segment 30 is provided on the top end portion of the detecting member 29 as to press on the side surface of the hook member 22. FIGS. 9 and 10 illustrate an assembly of the hook member 22 and the detecting member 29. One end of the spring 28 which is wound around the pin 27 is hooked on the latch segment 30 and another end of the spring 28 is mounted on the mounting portion 26. Consequently, the latch segment 30 is lifted and turned from the mounting portion 26 when the detecting member 29 turns in arrow A direction (FIG. 9), and the hook member 22 is turned around the pin 23 (refer to FIG. 1) in the clockwise direction together with the detecting member 29 when the detecting member 29 turns in arrow B direction.

The projecting portion 25 of the, hook member 22 can be seated on a notch portion 31 of the turning bracket 18. Further, the side surface of the projecting portion 25 can contact on the side surface of a latch segment 32 which includes the notch portion 31.

As shown in FIG. 2, the lower end portion of the actuating lever 20 is inserted into the inside portion from an opening 33 of formed in an upper surface of the upper rail 2.

A pair of detecting plates 34 and 35 spatially separated with each other is fixed to the side surface of the lower rail 1. The free end portion of the detecting member 29 can touch and slide on the detecting plates 34 and 35.

Here, a connecting rod 43 is connected to a turning bracket 18 and can turn together with the turning bracket 18. The connecting rod 43 transmits the rotation of the turning bracket 18 to a lock/unlock mechanism (the same mechanism as the mechanism of FIGS. 1 and 8) installed on the other side of the seat for locking or unlocking between the upper rail 2 and the lower rail 3.

Figure 8:
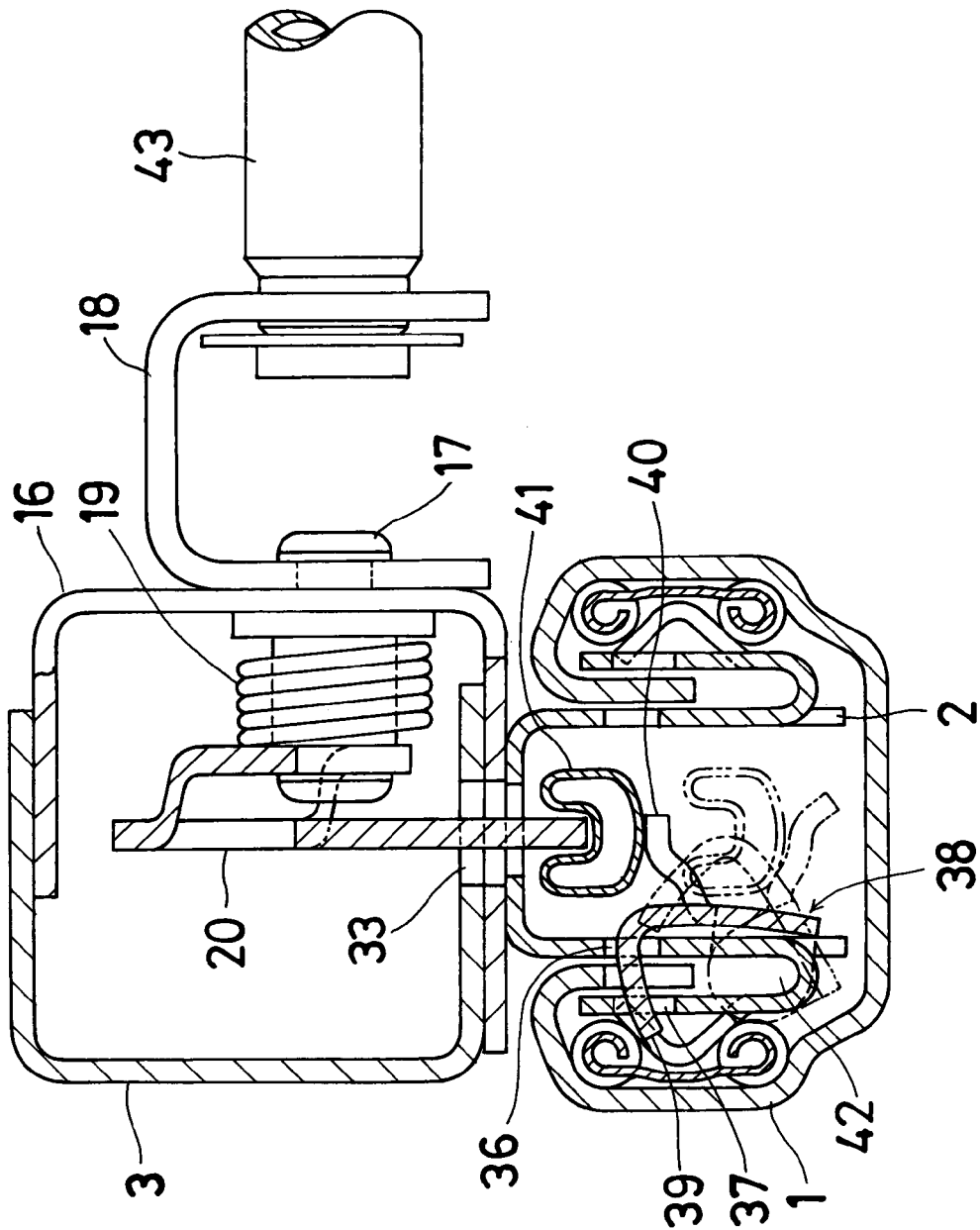
FIG. 8 is a cross sectional view of a mechanism of locking an upper rail in a lower rail.

As shown in FIG. 8, and like as a conventional seat slide device, the lower rail 1 has an "U" shaped cross section and the upper rail 2 has a reversed "U," shaped section.

As shown in FIG. 8, windows 36 and 37 are formed in opposed wall portions of the both lower and upper rails 1, 2, and lock segments 39 of lock levers 38 are inserted into the windows 36 and 37 (a locking condition of both lower and upper rails 1, 2). The lock lever 38 has a contact segment 40 and this contact segment 40 is opposed to the end portion of the actuating lever 20 via an end portion of a loop handle 41. The loop handle 41 has "U" shaped cross section for receiving the contact of the actuating lever 20, and the lower surface of the "U" shaped portion can contact on the segment 40. The contact segment 40 is a plate for receiving a force from the actuating lever 20 via the loop handle 41.

The lock lever 38 is rotatably connected to a lever center 42 mounted on the upper rail 2. The lock lever 38 is usually situated by spring force (the spring is not shown), in the locking position indicated by solid lines in FIG. 8.

When the actuating lever 20 is turned and the loop handle 41 is moved down, the loop handle 41 and the lock lever 38 are turned to the unlocking position indicated by two dot lines. Then, the lock segment 39 is disengaged from the windows 36 and 37 and the relative sliding movement between both upper and lower rails 1 and 2 is permitted.

When the rotational torque to the actuating lever 20 is released, the loop handle 41 and the lock lever 38 are moved back by the force of the spring 19 to the locking position indicated by the solid lines in FIG. 8.

FIG. 2 illustrates the seat situated in a seating position. In this situation, since a traction force is not applied to the cable 15, the turning bracket 18, the turning pin 17, and the actuating lever 20 are at the positions which are corresponding to positions shown by the solid line in FIG. 8, and both rails 1 and 2 are maintained in the locked condition.

Figure 3:
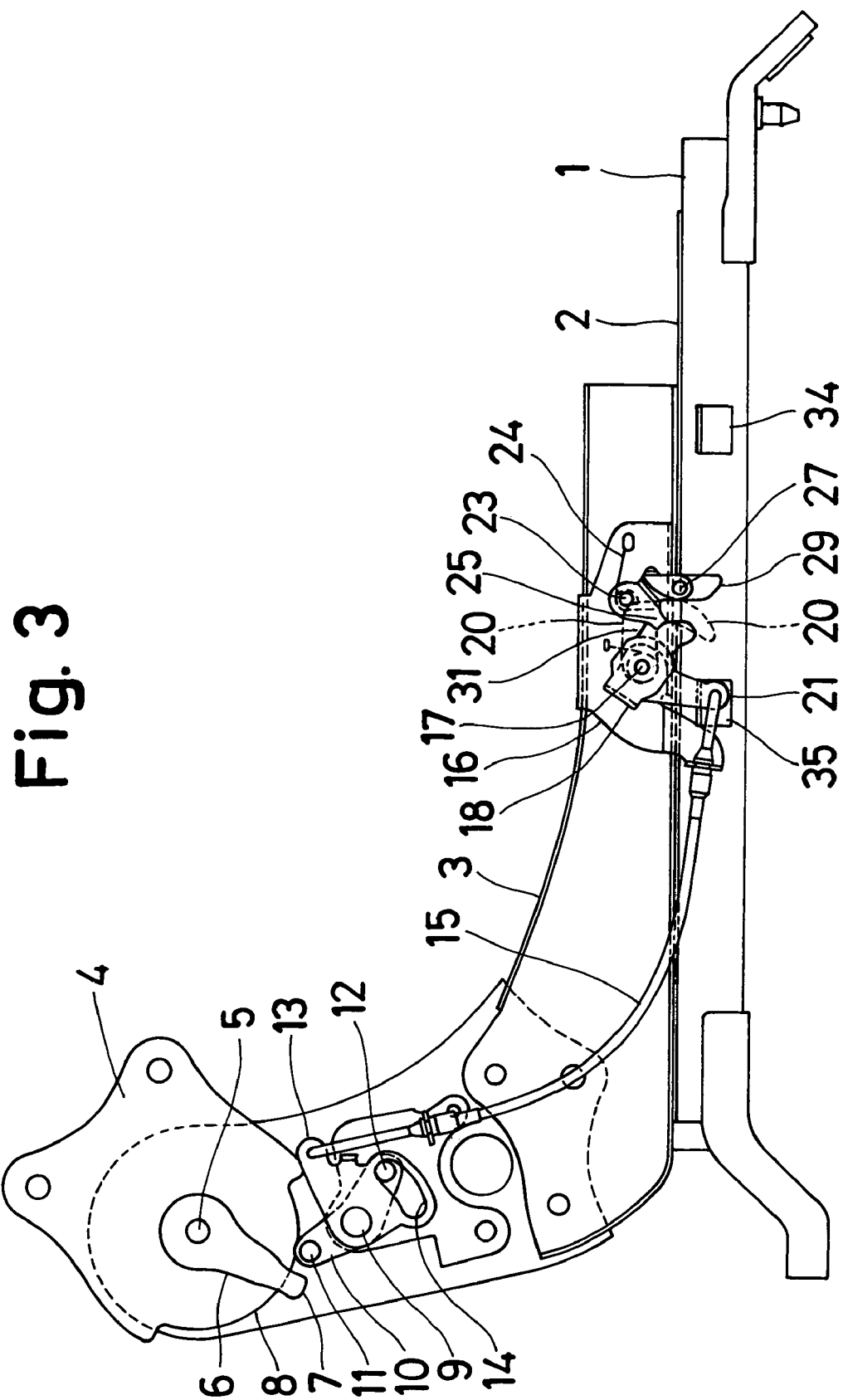
FIG. 3 to a side view of a case that a setback is turned down in forward direction due to a walk in operation.

FIG. 3 shows the situation of the seatback turned down in front direction for walk in operation. The free end portion 7 of the turning member 6 turns the first link member 10 around the pin 9 by contacting on the contact pin 11 to counterclockwise direction with the seatback down rotation in forward direction. Accordingly, the pin 12 pushes the end portion of the long hole 14 and turns the second link member 13 in the counterclockwise direction.

When traction force is applied to the cable 15 by turning the second link member 13, and the turning bracket 18 is turned together with the turning pin 17 in clockwise direction around the turning pin 17.

The actuating lever 20 is turned in clockwise direction via the turning pin 17 in the clockwise direction. The lock lever 38 is moved to the position shown by two dot lines in FIG. 8 from the solid lines position by the loop handle 41, and the lock segment 39 is disengaged from the windows 36 and 37 and both rails 1 and 2 are set in the unlocking condition. At the same time, the projecting portion 25 of the hook member 22 engages with the notch portion 31 of the turning bracket 18 by turning the turning bracket 18 in the clockwise direction, the rotation of the turning bracket 18 is prevented by the hook member 22, and the turning bracket 18 is maintained in the position shown in FIG. 3, and the both upper and lower rails 1 and 2 are kept in the unlocking condition.

Accordingly, the seat is possible to move in forward direction.

Figure 4:
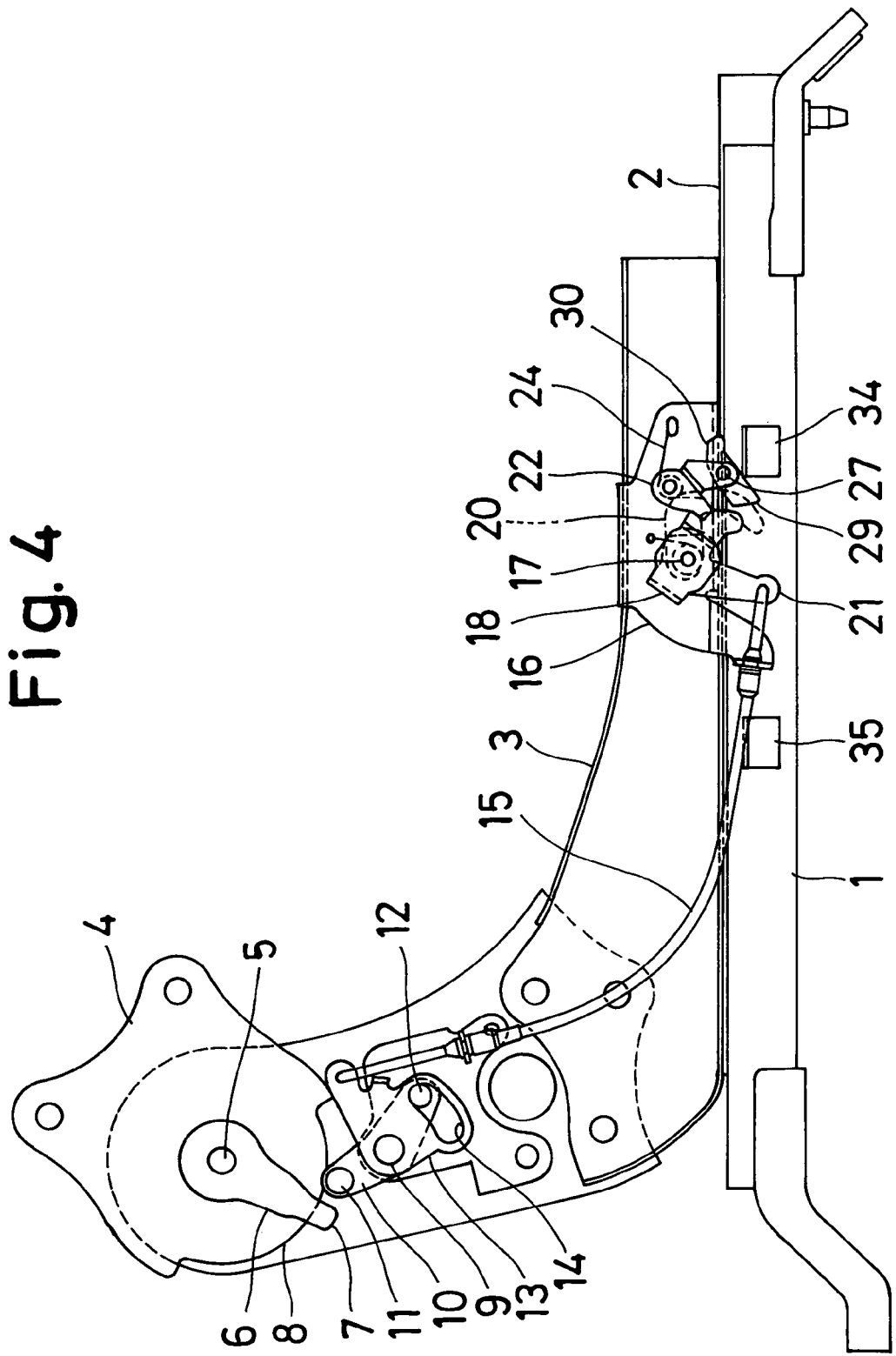
FIG. 4 is a side view of a case that a detector member gets in contact with a detector plate while the seat moves in forward direction.

FIG. 4 illustrates the situation that the detecting member 29 gets in contact with the detecting plate 34 during the seat is moved in forward direction. The detecting member 29 is turned around the pin 27 in the clockwise direction by the detecting member 29, but only the latch segment 30 moves to leave from the hook member 22 and the engagement of the projecting portion 25 on the notch portion 31 is kept, that is to say, the both upper and lower rails 1 and 2 are kept in the unlocking condition.

Figure 5:
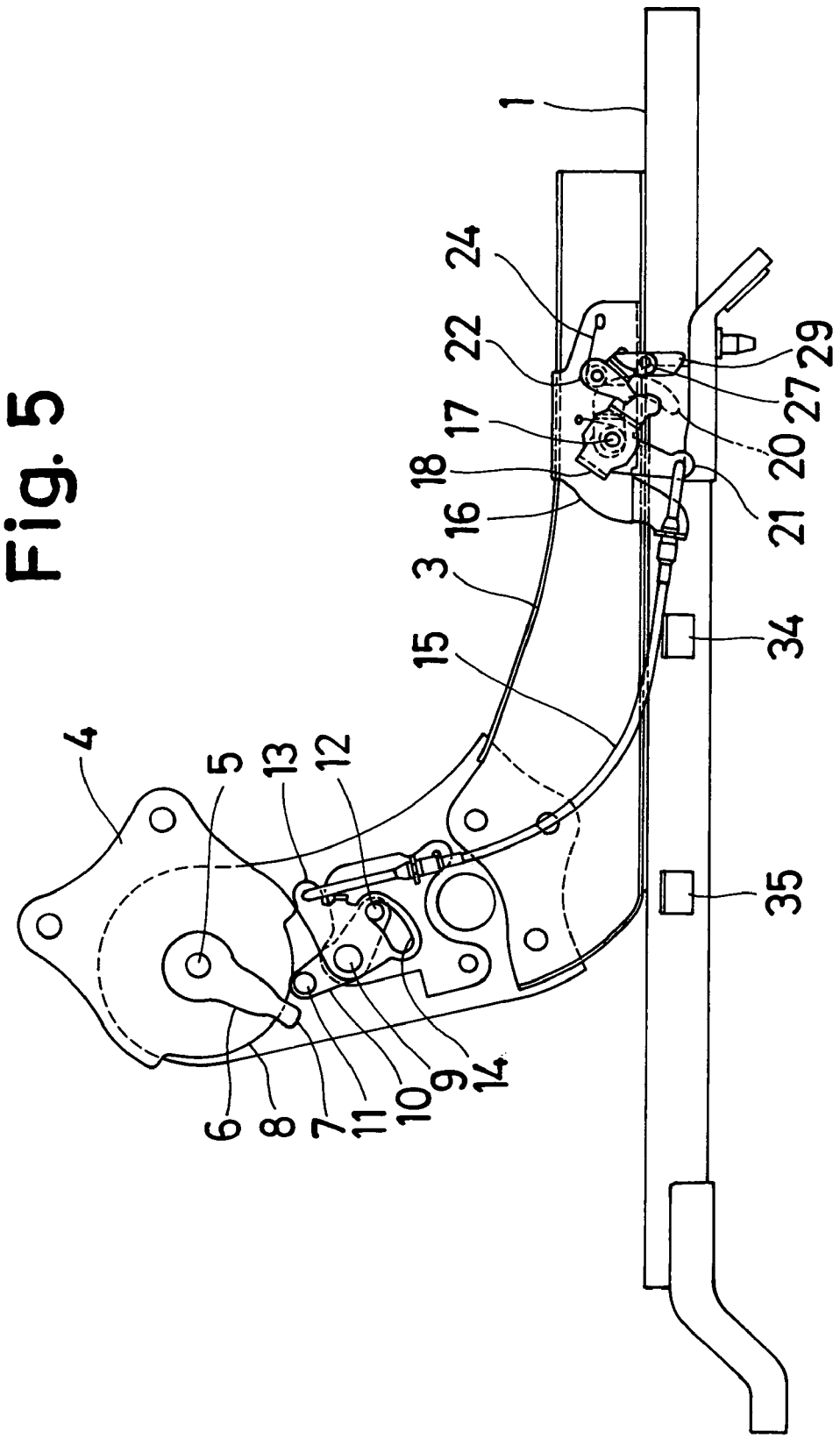
FIG. 5 is a side view of a case that the seat moves to the furthest position in forward direction.

FIG. 5 shows that the seat is moved to the front most position, that is to say, in this situation the walk in operation has been completed.

Figure 6:
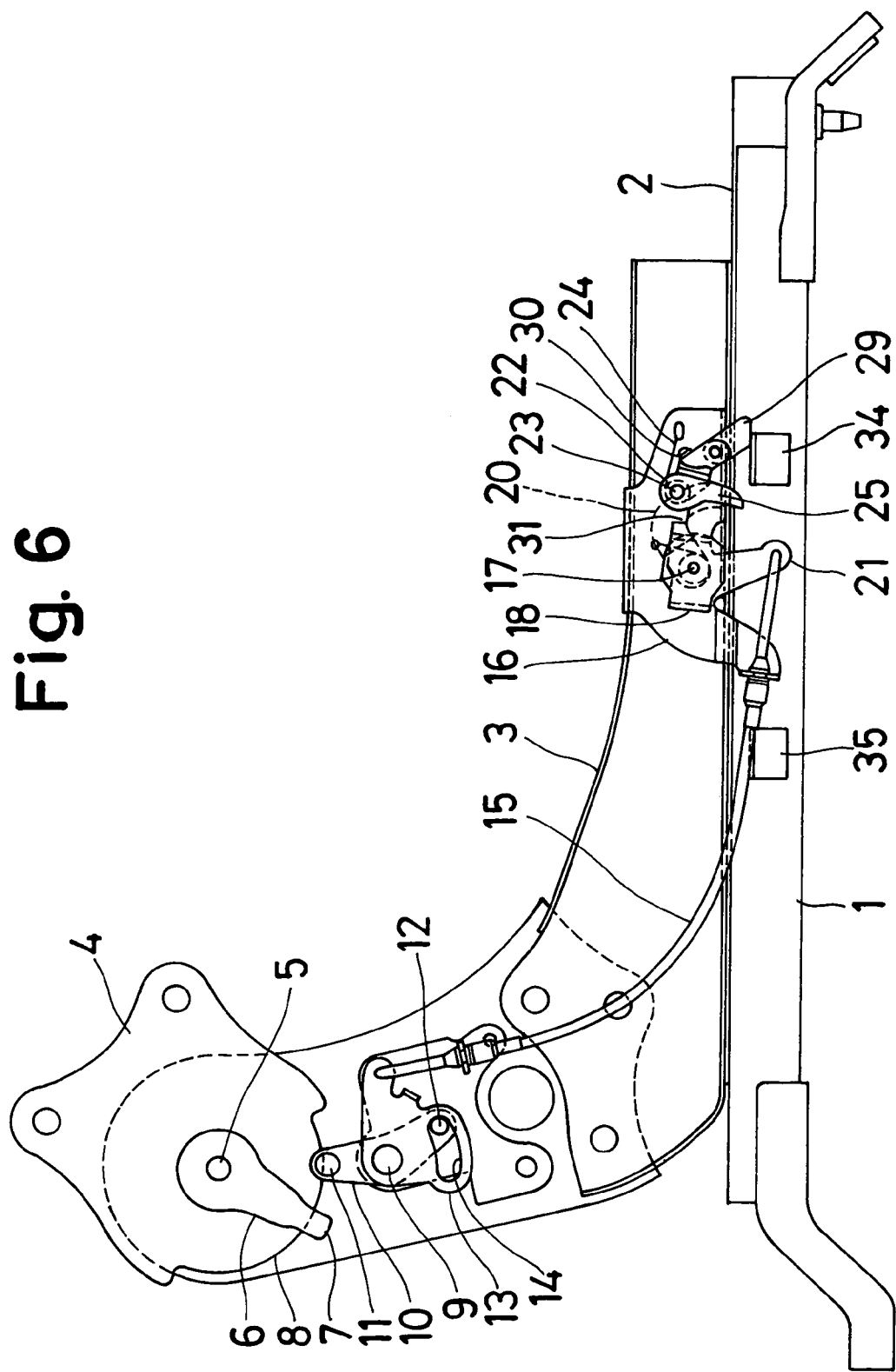
FIG. 6 is a side view of a case that the detector member gets in contact with the detector plate while the seat is moved in the backward direction so as to restore the seat to the predetermined position.

FIG. 6 shows that after the walk in operation is completed, the seat is moved backward. When the detecting member 29 gets in contact with the detecting plate 34, the detecting member 29 turns in counterclockwise direction. The hook member 22 is pushed and turned by the latch segment 30, and the hook member 22 is turned in counterclockwise direction together with the detecting member 29. Accordingly, the projecting portion 25 is disengaged from the notch portion 31 and the turning bracket 18 is turned in counterclockwise direction by the force of the spring 19.

The turning bracket 18 turns in counterclockwise direction with the actuating lever 20, then the lock lever 38 is moved back to the position of the solid lines in FIG. 8, the lock segment 39 is inserted into the windows 36 and 37 as illustrated in FIG. 2 and FIG. 8, and both rails 1 and 2 are set in locking condition.

In FIG. 6, if the seatback is restored to the original position, although the end portion 7 of the turning member 6 turns the first link member 10 in clockwise direction by the contact pin 11, the pin 12 moves only along the long hole 14 and does not turn the second link member 13. The condition shown in FIG. 2 is restored.

Figure 7:
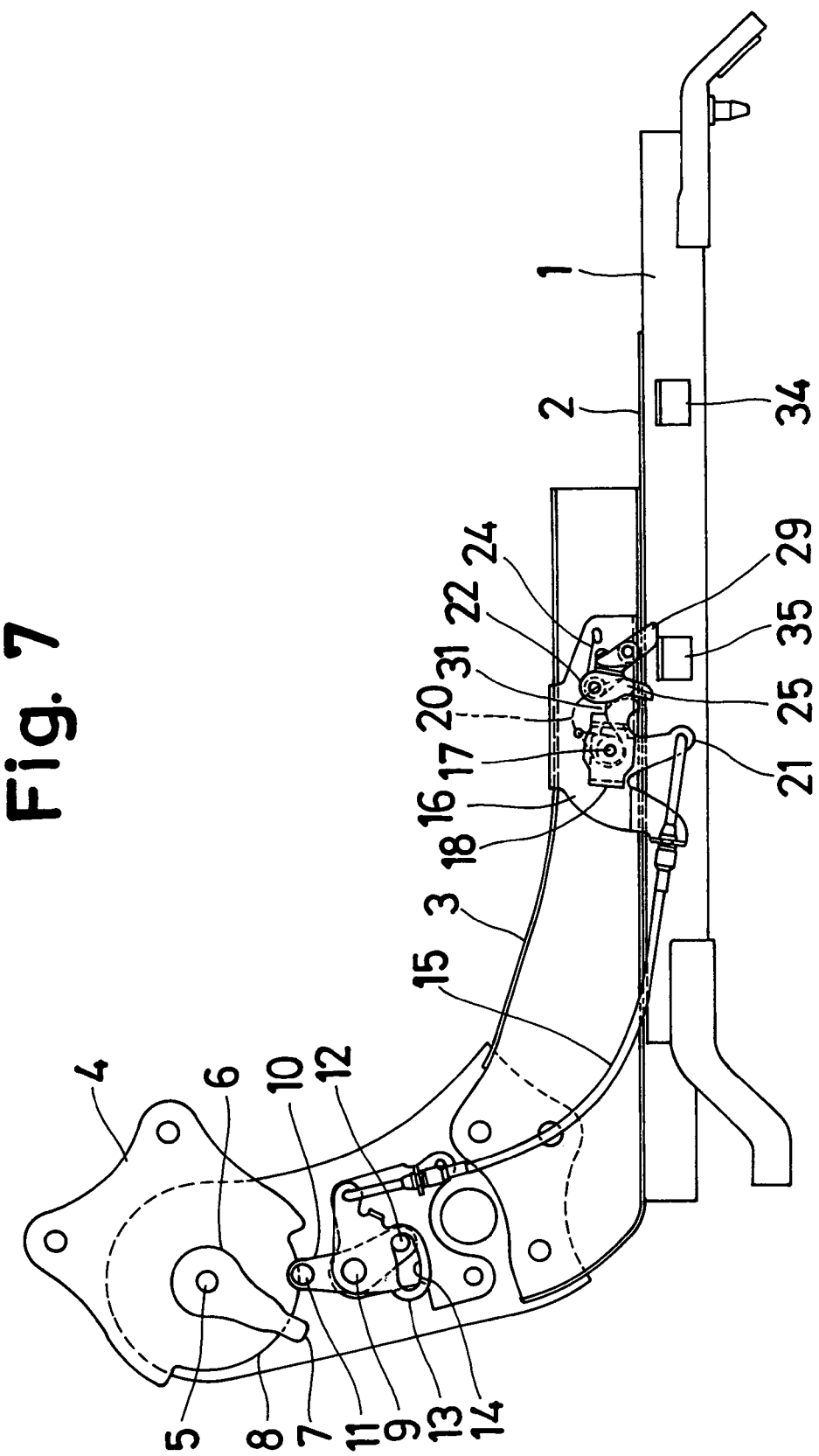
FIG. 7 is a side view of a case that the seat is moved in the backward direction due to a reverse walk in operation.

FIG. 7 illustrates a reverse walk in operation. In a vehicle equipped with seats which are also arranged in the second and third line, in order to use the space on the second and third line seats for baggage, the seat on the second line is moved to be closely adjacent to the seat on the third line, the seatback is turned down in forward direction and the locking condition is released, the seat on the second line is moved toward to the seat on the third. This operation is so called reverse walk in and is explained with reference to FIG. 7.

The seatback is turned down in forward direction and then the unlocking condition between the rails 1 and 2 is obtained as illustrated in FIG. 3. Then, if the seat is moved in the backward direction as illustrated in FIG. 7, the detecting member 29 gets in contact with the detecting plate 35, the detecting member 29 is turned in the counterclockwise direction, and then the hook member 22 is turned in the same direction as the detecting member 29. Then, the projecting portion 25 is disengaged from the notch portion 31 (in the same way as the case of FIG. 6). Accordingly, since the turning bracket 18 and the actuating lever 20 are turned in the counterclockwise direction and the seat is moved in the backward direction, both rails 1 and 2 are set to be the locking condition at the predetermined position.

When the seats on the second and third lines are used as baggage storage, the second line seat is moved not to have clearance with the seat on the third line, and maintained in the locking condition.

The operation for restoring to the position for seating as shown in FIG. 2 from the locking condition shown in FIG. 7 is performed by raising the seatback up and releasing the locking condition by operating the loop handle 41. Here, in the case that the seatback is turned down in forward direction without raising up the seatback, if the loop handle 41 is operated, the condition of FIG. 3 is obtained and then it becomes possible to move the seat at the time of releasing the lock.

What is claimed is:

1. A seat device, comprising a seatback, in combination with a lower rail and an upper rail, the seat device having a lock/unlock mechanism for releasing a locking condition between the lower rail and the upper rail by turning down the seatback in a forward direction and allowing said upper rail to slide on said lower rail, the seat device comprising:
a turning bracket of said lock/unlock mechanism rotatably supported on a lower arm fixed to said upper rail to rotate about an axis, said turning bracket being always fixed against sliding movement relative to the upper rail;
an actuating lever rotatable about said axis to rotate upon rotation of the turning bracket;
a lock segment inserted into opening portions of both rails to effect the locking condition, the lock segment being movable to a position releasing the locking condition in accordance with movement of said actuating lever, wherein said seatback turning down in said forward direction causes to turn said turning bracket and said actuating lever in one direction and release a locking condition of said both rails; and a hook member pivotally supported by said lower arm and having a projecting portion capable of engaging with or disengaging from a notch portion of said turning bracket, wherein said lower rail and upper rail are maintained to be released when said projecting portion is engaged with said notch portion.

2. The seat device according to claim 1, wherein:
said hook member has a detecting member contacting a detecting plate fixed to said lower rail to disengage said notch portion from said projecting portion.

3. The seat device according to claim 1 wherein:
said turning bracket and said actuating lever are connected to a turning pin penetrating a frame fixed to said upper rail.

4. The seat device according to claim 3, comprising:
a turning member fixed to an upper arm on a side portion of said seatback;
first and second link members pivotally supported by said lower arm; and
a cable connecting said second link member to said turning bracket,
wherein said turning member, by turning down said seatback in said forward direction, turns said first and second link members, and gives a traction force to said cable, and turns said turning bracket.

5. The seat device according to claim 4 wherein:
said turning bracket includes a connecting rod provided in a coaxial manner with said turning pin and transmits a turning force of said turning bracket to said lock/unlock mechanism for said lower and upper rails via said rod.

6. The seat device according to claim 2, further comprising:
at least two detecting plates spatially separated with each other in back and forth directions.

7. A seat device, comprising a seatback, in combination with a lower rail and an upper rail, the seat device having a lock/unlock mechanism for releasing a locking condition between the lower rail and the upper rail by turning down the seatback in a forward direction and allowing said upper rail to slide on said lower rail, the seat device comprising:
an upper arm supporting the seat back;
a lower arm rotatably connected with the upper arm in forward and backward directions,
a turning member fixed to said upper arm;
a first link member connected to said lower arm and being engageable with said turning member to turn relative to the lower arm;
a second link member connected to said lower arm and being engageable with said first link member to turn relative to the lower arm;
a frame fixed to said lower arm;
a turning pin penetrating said frame;
a turning bracket fixed to an end of said turning pin and connected with the second link member by connecting means; and
an actuating member fixed to an other end of said turning pin and being rotated to release lock condition of the upper rail relative to the lower rail when the upper arm is rotated in the forward direction.

8. The seat device according to claim 7, wherein:
said turning member turns together with said upper arm and has a free end portion projecting from a circumferential surface of said upper arm.

9. The seat device according to claim 7, wherein:
said first link member and said second link member are linked by a pin of said first link member.

10. The seat device according to claim 9, wherein:
said second link member provides a long hole for receiving said pin.

11. The seat device according to claim 10, wherein:
a free end portion of said turning member being arranged to turn said first link member and said pin of said first link member, wherein said pin does not turn said second link member but moves only along the long hole when said upper arm is restored to an original position.

12. The seat device according to claim 7 wherein: said second link member is connected with one end of a cable and the other end of the cable is connected with a leg segment of said turning bracket.

13. The seat device according to claim 7, further comprising:
the lower rail fixed to a floor of a vehicle;
the upper rail capable of sliding freely on said lower rail;
a lock lever pivotably supported on a lever center on the upper rail in order to control relative motion between said lower rail and said upper rail;
a contact segment connected to said lock lever for receiving a force from an actuating lever; and
a loop handle having a contact potion on said contact segment.

14. The seat device according to claim 13, wherein:
said turning bracket is connected to the actuating lever, a top end portion of which is inserted into an inside portion of said upper rail from an opening portion formed on a top surface of said upper rail.

15. The seat device according to claim 2 wherein:
said turning bracket and said actuating lever are connected to a turning pin penetrating a frame fixed to said upper rail.

16. The seat device according to claim 7 further comprising a rotatable lock lever provided with a lock segment which is positionable in an opening portion provided in the upper rail and an opening portion provided in the lower rail to effect the locking condition between the upper and lower rails, wherein rotation of the actuating member causes rotation of the lock lever to release the locking condition.

17. A seat device, comprising a seatback, in combination with a lower rail and an upper rail, the seat device having a lock/unlock mechanism for releasing a locking condition between the lower rail and the upper rail by turning down the seatback to allow the upper rail to slide relative to the lower rail, the seat device comprising:
a lower arm fixed relative to the upper rail;
an upper arm supporting the seatback, the upper arm being rotatably connected to the lower arm to rotate in forward and backward directions about an axis passing through the lower arm;
a turning bracket of the lock/unlock mechanism rotatably supported on the lower arm;
an actuating lever turning together with the turning bracket;
a lock segment insertable into an opening portion of the upper rail and an opening portion of the lower rail to effect the locking condition between the upper and, lower rails, the lock segment being operable based on turning movement of the actuating lever to release the locking condition, wherein turning down movement of the seatback in the forward direction causes the turning bracket and the actuating lever to turn together to operate the lock segment and release the locking condition;

a cable connected to the turning bracket; and a turning member fixed to the upper arm to rotate together with the upper arm, a first link member rotatably mounted on the lower arm and engageable by the turning member during turning down movement of the seatback in the forward direction to rotate the first link member, and a second link member rotatably mounted on the lower arm and engageable by the first link member during rotation of the first link member, the cable being connected to the second link member.

18. The seat device according to claim 17, further comprising a link member rotatably mounted on the lower arm and rotatable in response to turning down movement of the seatback in the forward direction, the cable being connected to the link member.

19. The seat device according to claim 17, further comprising a spring which applies a biasing force to the actuating lever.

* * * * *